US006745142B2

(12) United States Patent
Fu et al.

(10) Patent No.: US 6,745,142 B2
(45) Date of Patent: Jun. 1, 2004

(54) RECIPE COMPARISON SYSTEM

(75) Inventors: Ming-Rong Fu, Taoyuan Hsien (TW);
Rex Lin, Taoyuan Hsien (TW);
Nai-Tien Ou, Hsinchu (TW);
Constance Chu, Hsinchu (TW);
Jiun-Shian Shiau, Kaoshiung Hsien (TW); Ying-Wei Hsu, Hsinchu (TW)

(73) Assignee: Taiwan Semiconductor Manufacturing Co., Ltd., Hsin-chu (TW)

( * ) Notice: Subject to any disclaimer, the term of this patent is extended or adjusted under 35 U.S.C. 154(b) by 242 days.

(21) Appl. No.: 09/910,714

(22) Filed: Jul. 24, 2001

(65) Prior Publication Data

US 2002/0183950 A1 Dec. 5, 2002

(30) Foreign Application Priority Data

Apr. 10, 2001 (TW) ........................................ 90108560 A

(51) Int. Cl.$^7$ .............................................. G06F 19/00
(52) U.S. Cl. ...................... 702/84; 700/100; 700/117; 700/121
(58) Field of Search ....................... 707/104.1, 1, 10; 700/100, 117, 121; 702/84

(56) References Cited

U.S. PATENT DOCUMENTS 6,035,293 A * 3/2000 Lantz et al. ................... 707/1
6,430,572 B1 * 8/2002 Steffan et al. ............ 707/104.1

FOREIGN PATENT DOCUMENTS

| JP | 411345751 A | * 12/1999 |
| TW | 87105825 | 4/1998 |
| TW | 86107114 | 5/1998 |
| TW | 388949 | 5/2000 |
| TW | 414997 | 12/2000 |

OTHER PUBLICATIONS

Semi, "Specification for Metrology Specific Equipment Model", Semi E30.5–0701, Semi 2001.

Semi, "Recipe Description and Process Program Definition", Semi E30–1103, Semi 1992, 2003.

Semi, Semi Equipment Communications Standard 2 Message Content (SECS–II), Semi E5–0301, Semi 1982, 2001.

* cited by examiner

Primary Examiner—John Barlow
Assistant Examiner—Stephen J. Cherry
(74) Attorney, Agent, or Firm—Birch, Stewart, Kolasch & Birch, LLP

(57) ABSTRACT

A recipe comparison system having recipe management ability in both offline accessing and online operating modes. The recipe comparison system includes an equipment server, an analysis module, and a recipe management module. The equipment server receives an upload signal, and then sends a recipe to the analysis module based on the upload signal. Then, the analysis module parses the recipe into internal-format-data according to a parsing rule, and outputs the internal-format-data to the recipe management module. If the recipe comparison system is in offline accessing mode, the recipe management module checks whether the internal-format-data obeys a specification definition. If the recipe comparison system is in the online operating mode, the recipe management module compares the internal-format-data with a standard recipe stored in a storage module.

36 Claims, 4 Drawing Sheets

RECIPE COMPARISON SYSTEM

BACKGROUND OF THE INVENTION

1. Field of the Invention

The present invention relates to a recipe comparison system for manufacturing equipment, and particularly to a recipe comparison system having recipe management ability in both an offline accessing mode and an online operating mode, so as to prevent wrong lot processing caused by an illegal recipe.

2. Description of the Related Art

In manufacturing equipment, for example, semiconductor-manufacturing equipment, high yield and maintaining the high quality of the products is a primary aim.

In a foundry factory with a high product mix, the process engineers must fine-tune many equipment product recipes either daily or weekly. Process engineers also need to test new product recipes to improve yield. During the fine-tuning process, a single small mistake can result in major setbacks. Large amounts of wafers either may be of low yield or have to be scrapped.

In conventional manufacturing equipment, due to the lack of any mechanism for automatic recipe comparison or mechanism of recipe cross-reference among different machines of the same equipment type, there is distinct potential for the above-described problems.

SUMMARY OF THE INVENTION

It is therefore an object of the present invention to provide an automatic mechanism for comparing equipment recipe content before processing in both offline accessing and online operating modes, to prevent mistakes. Another object of the present invention is to provide recipe cross-reference among differently configured equipment units in the offline-accessing mode, thus making recipe management more efficient.

To achieve the above object, the present invention provides a recipe comparison system having recipe management ability in both offline accessing and online operating modes. The recipe comparison system includes an equipment server, an analysis module, and a recipe management module.

In this recipe comparison system, the analysis module is coupled to the equipment server, and the recipe management module is coupled to the analysis module. The equipment server receives an upload signal, then sends a recipe to the analysis module based on the upload signal. The analysis module then parses the recipe into internal-format-data according to a parsing rule, and outputs the internal-format-data to the recipe management module.

If the recipe comparison system is in offline-accessing mode, the recipe management module checks whether the internal-format-data obeys a specification definition. If the recipe comparison system is in online-operating mode, the recipe management module compares the internal-format-data with a standard recipe stored in a storage module.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Referring to the accompanying figures, a preferred embodiment according to the present invention follows.

Figure 1:
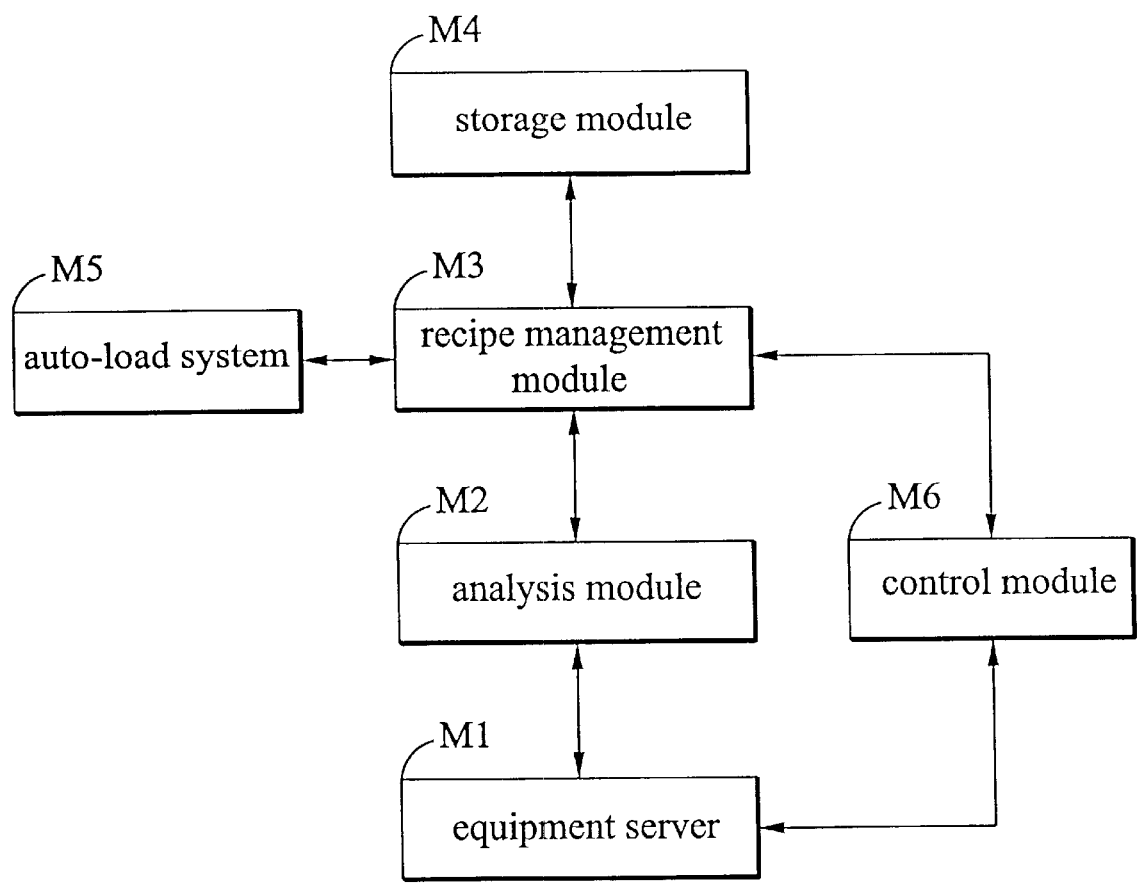
FIG. 1 is a schematic diagram showing the system construction of a recipe comparison system according to the embodiment of the present invention.

FIG. 1 shows the system construction of a recipe comparison system according to the embodiment of the present invention. As shown in FIG. 1, a recipe comparison system comprises an equipment server M1, an analysis module M2, a recipe management module M3, a storage module M4, an auto-load system M5, and a control module M6. The equipment server M1 can be a server for a semiconductor manufacturing equipment.

First, the control module M6 sends an upload signal to the equipment server M1. The equipment server M1, coupled to the control module M6, receives the upload signal and sends a recipe to the analysis module M2 based on the upload signal. For example, the upload signal may contain information designating a specific recipe. When the equipment server M1 receives the upload signal, the equipment server M1 sends the recipe according to the information in the upload signal to the analysis module M2.

The analysis module M2, coupled to the equipment server M1, receives the recipe sent from the equipment server M1. The analysis module M2 then parses the recipe into internal-format-data and outputs the internal-format-data to the recipe management module M3, wherein the internal-format-data may be a tree-structure format.

Figure 2:
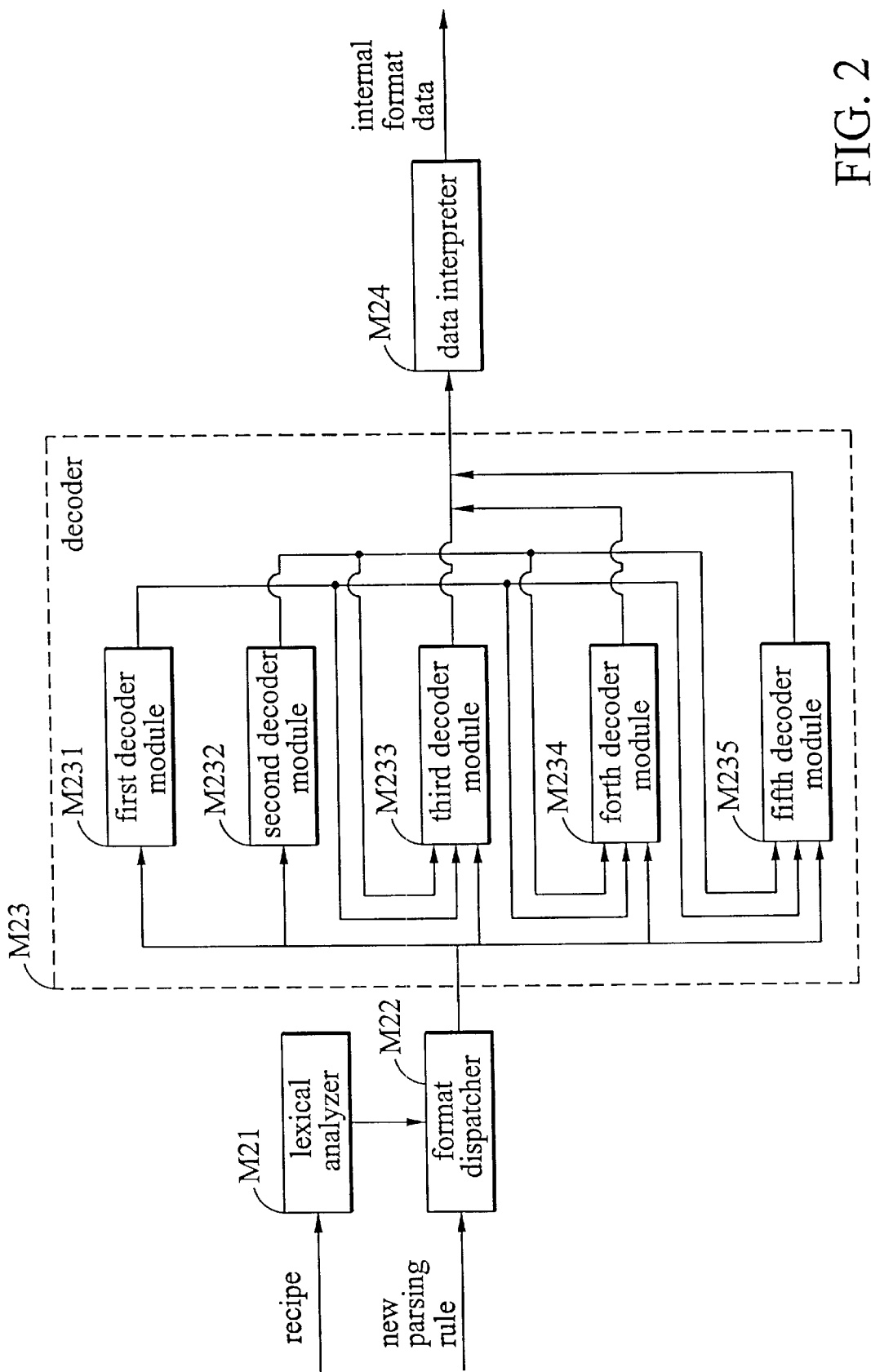
FIG. 2 is a schematic diagram showing the components of the analysis module in the embodiment of the present invention.

The detail of the analysis module M2 follows. The analysis module M2, comprising a lexical analyzer M21, a format dispatcher M22, a decoder M23, and a data interpreter M24, is shown in FIG. 2.

The lexical analyzer M21 receives the recipe sent from the equipment server M1. The lexical analyzer M21 then analyzes a lexical rule of the recipe, and outputs the lexical rule and the recipe to the format dispatcher M22. Then, the format dispatcher M22 compares the lexical rule with a parsing rule, so as to form a comparison result, and sends the recipe according to the comparison result to the decoder M23.

The decoder M23, comprising a first decoder module M231, a second decoder module M232, a third decoder module M233, a forth decoder module M234, and a fifth decoder module M235, is coupled to the format dispatcher M22, to receive the recipe. Then, the decoder M23 decodes the recipe and outputs a decoding result to the data interpreter M24. The data interpreter M24 is coupled to the decoder M23, to receive the decoding result. The data interpreter M24 then interprets the decode result into internal-format-data and outputs the internal-format-data to the recipe management module M3.

In the decoder M23, the first decoder module M231 is coupled to receive the recipe. Then, the first decoder module M231 applies a text-type decode to the recipe and outputs a first processing result; the second decoder module M232 is coupled to receive the recipe. Then, the second decoder module M232 applies a formatted-type decode to the recipe and outputs a second processing result.

The third decoder module M233 is coupled to receive the recipe, the first processing result, and the second processing result. Then, the third decoder module M233 applies a unit-structure-type decode to the recipe, the first processing result, and the second processing result, and outputs the decoding result; the forth decoder module M234 is coupled to receive the recipe, the first processing result, and the second processing result. Then, the fourth decoder module M234 applies an iterative-structure-type decode to the recipe, the first processing result, and the second processing result, and outputs the decoding result; and the fifth decoder module M235 is coupled to receive the recipe, the first processing result, and the second processing result. Then, the fifth decoder module M235 applies a nested-structure-type decode to the recipe, the first processing result, and the second processing result, and outputs the decoding result.

Figure 3:
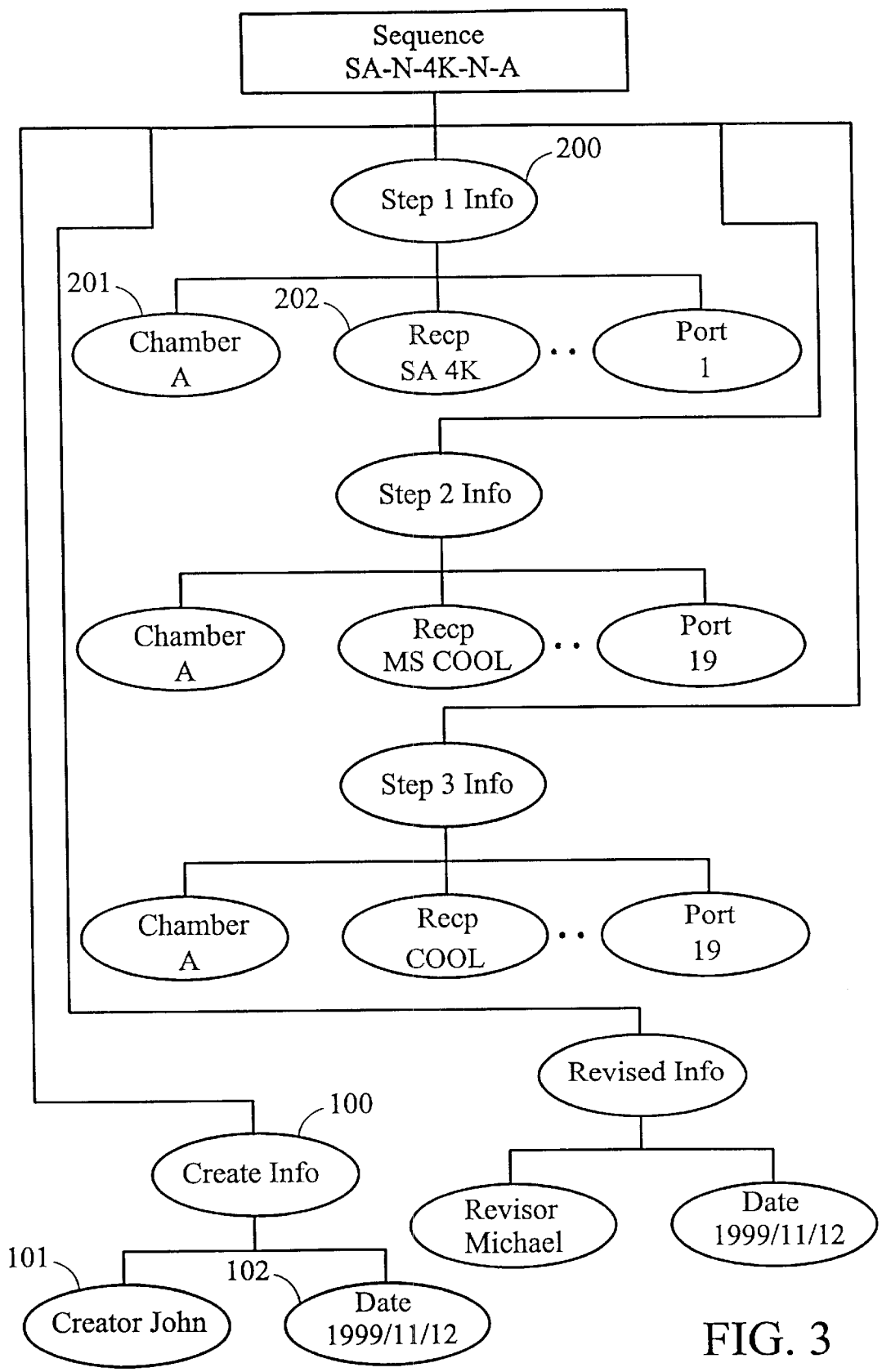
FIG. 3 is a schematic diagram showing a tree-structure result of a recipe parsed by the analysis module in the embodiment of the present invention.

Moreover, in the embodiment of the present invention, the recipe parsed by the analysis module M2 results in a tree-structure result, as shown in FIG. 3. In FIG. 3, each node represents the established information of the recipe or the contents of the parameters of the recipe. Nodes under node 100 represent the established information of the recipe, for example, node 101 represents the author of the recipe, and node 102 represents the time of the establishment of the recipe. Nodes under node 200 represent the related information in step 1 of whole process, for example, node 201 represents the reacted chamber, and node 202 represents the name of the parameter in step 1, etc.

Furthermore, the recipe management module M3 is coupled to the analysis module M2 to receive the internal-format-data sent from the analysis module M2. If the recipe comparison system is in a first operating mode, the recipe management module M3 checks whether the internal-format-data obeys a specification definition. If the recipe comparison system is in a second operating mode, the recipe management module M3 compares the internal-format-data with a standard recipe stored in the storage module M4. Wherein the first operating mode is an offline-accessing mode and the second operating mode is an online operating mode.

In the offline-accessing mode, if the internal-format-data obeys the specification definition, then the recipe management module M3 stores the internal-format-data and attached data corresponding to the internal-format-data into the storage module M4. In addition, if the internal-format-data does not obey the specification definition, then the recipe management module M3 outputs check-error information to the control module M6. The attached data contains a modified time and status information of the recipe.

Figure 4:
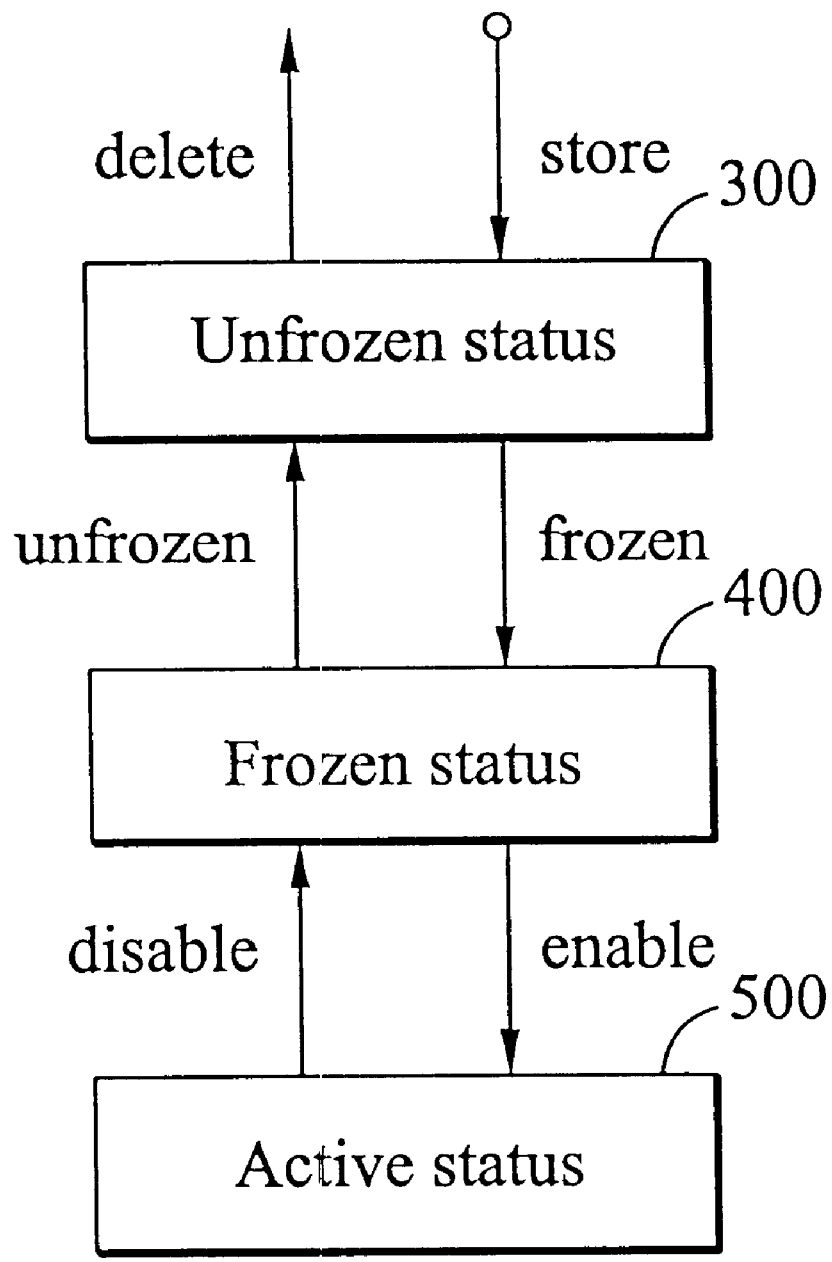
FIG. 4 is a schematic diagram showing the status of the recipe in the embodiment of the present invention.

FIG. 4 shows the status of the recipe in the embodiment of the present invention. The status information is one of the unfrozen status 300, the frozen status 400, and the active status 500. When a recipe was stored into the storage module M4 the first time, the recipe was in the unfrozen status 300, and the recipe in the unfrozen status 300 can be deleted in the storage module M4. If the process engineer decides that the recipe is correct, then the process engineer can set the status of the recipe from the unfrozen status 300 into the frozen status 400, and the recipe in the frozen status 400 can be set into the active status 500. the recipe in the active status 500 can be used as the standard recipe.

In addition, table 1 is an example of the specification definition. The specification definition includes the parameter information, tolerance limitation, and specification limitation. The specification limitation represents the accepted range of the parameter used in the process, and the tolerance limitation represents the tolerant range of the parameter in different recipe versions.

TABLE 1

| Parameter Name | Value | Run Tolerance Lower Limit | Run Tolerance Upper Limit | Refined (%) | Specification Lower Limit | Specification Upper Limit |
| --- | --- | --- | --- | --- | --- | --- |
| Xsigma | 30 | 27 | 33 | 3% | 0 | 100 |
| DoseCalibration | 37 | 35.15 | 38.85 | 5% | 25 | 50 |
| GasPress | 47 | 44.65 | 49.35 | 1% | 27 | 67 |
| HeaterTemp | 31 | 29.45 | 32.55 | 2% | 20 | 45 |
| Energy | 50 | 50 | 50.5 | 1% | 50 | 51 |

On the other hand, in the offline-accessing mode, the recipe management module M3 compares the internal-format-data with the standard recipe stored in the storage module M4. If the internal-format-data is the same as the standard recipe, then the recipe management module M3 outputs a compare-success signal to the auto-load system M5 coupled to the recipe management module M3. Then, the auto-load system M5 loads a lot into the manufacturing equipment based on the compare-success signal to start the process. If the internal-format-data is different from the standard recipe, the recipe management module M3 outputs compare-fail information to the control module M6. In this case, the comparison of the internal-format-data and the standard recipe collates the modification date and at least one predetermined key parameter determined by the process engineer.

Moreover, the control module M6 can be a control panel for the process engineer, comprising a display module (not shown in FIG. 1), coupled to the equipment server M1 and the recipe management module M3, to send the aforementioned upload signal to the equipment server M1 and receive the check-error information and the compare-fail information sent from the recipe management module M3. The process engineer can use the control module M6 to send the upload signal, namely upload the recipe, to start the recipe comparison system procedure.

The check-error information contains a parameter name and a parameter value corresponding to the parameter name. The control module MG can display the check-error information and the compare-fail information in the display module, and the failed parameter name and the parameter value can be marked in different colors.

Furthermore, if the parsing rule need to be changed, the recipe management module M3 can further output a new parsing rule to the format dispatcher M22 in the analysis module M2 for updating the parsing rule. In addition, if the recipe comparison system is in the offline accessing mode, the recipe management module M3 can cross reference the recipes stored in the storage module M4, and the recipes belong to different equipment servers.

As a result, the process engineer can use the recipe comparison system according to the present invention to automatically compare the equipment recipe with the standard recipe before processing, so as to effectively prevent wrong lot processing caused by illegal recipes, out-of-control recipe parameters, and human error.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A recipe comparison system, comprising
an equipment server for receiving an upload signal, and outputting a recipe based on the upload signal;
an analysis module coupled to the equipment server to receive the recipe, parse the recipe into an internal-format-data, and output the internal-format-data; and
a recipe management module coupled to the analysis module to receive the internal-format-data, check whether the internal-format-data obeys a specification definition in a first operating mode, and compare the internal-format-data with a standard recipe stored in a storage module in a second operating mode,
wherein the analysis module comprises:
a lexical analyzer for receiving the recipe, analyzing the lexical rule of the recipe, and outputting the lexical rule and the recipe;
a format dispatcher coupled to the lexical analyzer to receive the lexical rule and the recipe, compare the lexical rule with the parsing rule, so as to form a comparison result, and send the recipe according to the comparison result;
a decoder coupled to the format dispatcher to receive the recipe, decode the recipe, and output a decoding result; and
a data interpreter coupled to the decoder to receive the decoding result, interpret the decoding result into the internal-format-data, and output the internal-format-data.

2. The system as claimed in claim 1 wherein the recipe management module stores the internal-format-data and attached data corresponding to the internal-format-data into the storage module if the internal-format-data obey the specification definition in the first operating mode.

3. The system as claimed in claim 2 wherein the attached data comprises a modification date.

4. The system as claimed in claim 2 wherein the attached data comprises status information, and the status information belongs to the group consisting of unfrozen status, frozen status, and active status.

5. The system as claimed in claim 1 wherein the recipe management module outputs check-error information if the internal-format-data does not obey the specification definition in the first operating mode.

6. The system as claimed in claim 5 wherein the specification definition comprises the parameter information, the tolerance limitation, and the specification limitation.

7. The system as claimed in claim 5 wherein the check-error information comprises a parameter name and a parameter value corresponding to the parameter name.

8. The system as claimed in claim 1 wherein the recipe management module outputs a compare-success signal if the internal-format-data is the same as the standard recipe in the second operating mode.

9. The system as claimed in claim 8 further comprising an auto-load system coupled to the recipe management module to receive the compare-success signal, and load a lot into manufacturing equipment based on the compare-success signal.

10. The system as claimed in claim 1 wherein the recipe management module outputs a compare-fail information if the internal-format-data is different from the standard recipe in the second operating mode.

11. The system as claimed in claim 1, wherein comparison of the internal-format-data with the standard recipe in the second operating mode is to collate with a modification date.

12. The system as claimed in claim 1, wherein comparison of the internal-format-data with the standard recipe in the second operating mode is to collate with at least one predetermined key parameter.

13. The system as claimed in claim 1 further comprising a control module coupled to the equipment server and the recipe management module to output the upload signal, and receive check-error information and compare-fail information.

14. The system as claimed in claim 13 wherein the control module comprises a display module for displaying the check-error information and the compare-fail information.

15. The system as claimed in claim 1 wherein the recipe management module further compares any two equipment recipes stored in the storage module in the first operating mode.

16. The system as claimed in claim 1 wherein the decoder comprises:
a first decoder module for receiving the recipe, applies a text-type decode to the recipe, and outputs a first processing result;
a second decoder module for receiving the recipe, applies a formatted-type decode to the recipe, and outputs a second processing result;
a third decoder module for receiving the recipe, the first processing result, and the second processing result, applies a unit-structure-type decode to the recipe, the first processing result, and the second processing result, and outputs the decoding result;
a fourth decoder module for receiving the recipe, the first processing result, and the second processing result, applies a iterative-structure-type decode to the recipe, the first processing result, and the second processing result, and outputs the decoding result; and
a fifth decoder module for receiving the recipe, the first processing result, and the second processing result, applies a nested-structure-type decode to the recipe, the first processing result, and the second processing result, and outputs the decoding result.

17. The system as claimed in claim 1 wherein the recipe management module further outputs a new parsing rule for updating the parsing rule to the analysis module.

18. The system as claimed in claim 1 wherein the internal-format-data is a tree-structure data.

19. A recipe comparison method, comprising the steps of:
providing an analysis module to receive a recipe from an equipment server, and to parse the recipe into an internal-format-data; and
checking whether the internal-format-data obeys a specification definition in a first operating mode, and comparing the internal-format-data with a standard recipe stored in a storage module in a second operating mode, wherein the analysis module comprises:
- a lexical analyzer for receiving the recipe, analyzing the lexical rule of the recipe, and outputting the lexical rule and the recipe;
- a format dispatcher coupled to the lexical analyzer to receive the lexical rule and the recipe, compare the lexical rule with a parsing rule, so as to form a comparison result, and send the recipe according to the comparison result;
- a decoder coupled to the format dispatcher to receive the recipe, decode the recipe, and output a decoding result; and
- a data interpreter coupled to the decoder to receive the decoding result, interpret the decoding result into the internal-format-data, and output the internal-format-data.

20. The method as claimed in claim 19 further comprising storing the internal-format-data and attached data corresponding to the internal-format-data into the storage module if the internal-format-data obey the specification definition in the first operating mode.

21. The method as claimed in claim 20 wherein the attached data comprises a modification date.

22. The method as claimed in claim 20 wherein the attached data comprises status information, and the status information belongs to the group consisting of unfrozen status, frozen status, and active status.

23. The method as claimed in claim 19 further comprising outputting a check-error information if the internal-format-data does not obey the specification definition in the first operating mode.

24. The method as claimed in claim 23 wherein the specification definition comprises the parameter information, the tolerance limitation, and the specification limitation.

25. The method as claimed in claim 23 wherein the check-error information comprises a parameter name and a parameter value corresponding to the parameter name.

26. The method as claimed in claim 19 further comprising outputting a compare-success signal if the internal-format-data is the same as the standard recipe in the second operating mode.

27. The method as claimed in claim 26 further comprising providing an auto-load system to receive the compare-success signal, and load a lot into manufacturing equipment based on the compare-success signal.

28. The method as claimed in claim 19 further comprising outputting a compare-fail information if the internal-format-data is different from the standard recipe in the second operating mode.

29. The method as claimed in claim 19 wherein comparison of the internal-format-data with the standard recipe in the second operating mode is to collate with a modification date.

30. The method as claimed in claim 19 wherein comparison of the internal-format-data with the standard recipe in the second operating mode is to collate with at least one predetermined key parameter.

31. The method as claimed in claim 21 further comprising providing a control module to output the upload signal, and receive check-error information and compare-fail information.

32. The method as claimed in claim 31 further comprising displaying the check-error information and the compare-fail information.

33. The method as claimed in claim 21 further comprising comparing any two equipment recipes stored in the storage module in the first operating mode.

34. The method as claimed in claim 19 wherein the decoder comprises:
- a first decoder module for receiving the recipe, applies a text-type decoder to the recipe, and outputs a first processing result;
- a second decoder module for receiving the recipe, applies a formatted-type decode to the recipe, and outputs a second processing result;
- a third decoder module for receiving the recipe, the first processing result, and the second processing result, applies a unit-structure-type decode to the recipe, the first processing result, and the second processing result, and outputs the decoding result;
- a fourth decoder module for receiving the recipe, the first processing result, and the second processing result, applies an iterative-structure-type decode to the recipe, the first processing result, and the second processing result, and outputs the decoding result; and
- a fifth decoder module for receiving the recipe, the first processing result, and the second processing result applies a nested-structure-type decode to the recipe, the first processing result, and the second processing result, and outputs the decoding result.

35. The method as claimed in claim 19 further comprising outputting a new parsing rule for updating the parsing rule to the analysis module.

36. The method as claimed in claim 19 wherein the internal-format-data is a tree-structure data.

* * * * *